(12) United States Patent
Johnson et al.

(10) Patent No.: US 9,400,047 B2
(45) Date of Patent: Jul. 26, 2016

(54) SELF LUBRICATING LINEAR MOTION GUIDED SCREW ASSEMBLY

(71) Applicant: Ball Screws and Actuators Co., San Jose, CA (US)

(72) Inventors: Jeffrey G. Johnson, Carpentersville, IL (US); Robert A. Lipsett, San Jose, CA (US); Matthew Asher, San Jose, CA (US)

(73) Assignee: Balls Screws and Actuators Co., San Jose, CA (US)

( * ) Notice: Subject to any disclaimer, the term of this patent is extended or adjusted under 35 U.S.C. 154(b) by 464 days.

(21) Appl. No.: 13/744,580

(22) Filed: Jan. 18, 2013

(65) Prior Publication Data

US 2013/0160586 A1 Jun. 27, 2013

Related U.S. Application Data

(63) Continuation-in-part of application No. 13/445,469, filed on Apr. 12, 2012.

(60) Provisional application No. 61/475,877, filed on Apr. 15, 2011.

(51) Int. Cl.
*F16H 25/12* (2006.01)
*F16H 57/04* (2010.01)
*F16C 33/66* (2006.01)
*F16C 29/06* (2006.01)
*F16H 25/22* (2006.01)
*F16H 25/24* (2006.01)

(52) U.S. Cl.
CPC ........ *F16H 57/0467* (2013.01); *F16C 29/0683* (2013.01); *F16C 33/6648* (2013.01); *F16C 33/6688* (2013.01); *F16H 25/12* (2013.01); *F16H 57/0497* (2013.01); *F16H 25/2204* (2013.01); *F16H 57/041* (2013.01); *F16H 2025/249* (2013.01); *Y10T 74/18744* (2015.01)

(58) Field of Classification Search
CPC ............ F16H 57/0497; F16H 25/2418; F16H 57/0406; F16H 2025/249; F16C 33/66
USPC .......... 74/89.23, 89.32, 89.33, 89.44, 424.71, 74/467
See application file for complete search history.

(56) References Cited

U.S. PATENT DOCUMENTS

| | | | |
|---|---|---|---|
| 5,195,391 A | 3/1993 | Barbat et al. | |
| 6,023,991 A * | 2/2000 | Yabe | F16H 57/0497 74/89.44 |
| 6,178,839 B1 * | 1/2001 | Yoshida | F16H 25/2418 74/424.87 |
| 6,724,714 B1 | 4/2004 | Kato et al. | |
| 2002/0056330 A1 * | 5/2002 | Nishide | F16H 57/0497 74/89.44 |
| 2005/0178224 A1 * | 8/2005 | Czarnek | F16C 17/02 74/89.23 |
| 2005/0252324 A1 * | 11/2005 | Kato | F16H 25/2204 74/89.44 |
| 2006/0088430 A1 * | 4/2006 | Sakurai | F16H 25/2418 417/572 |
| 2009/0022437 A1 * | 1/2009 | Vierheilig | F16C 29/068 384/13 |
| 2009/0133520 A1 * | 5/2009 | Chen | F16H 57/0497 74/89.44 |
| 2009/0294203 A1 | 12/2009 | Okada et al. | |

* cited by examiner

*Primary Examiner* — David M Fenstermacher
(74) *Attorney, Agent, or Firm* — Dilworth & Barrese, LLP

(57) ABSTRACT

A cartridge assembly for use in conjunction with a linear motion guided screw assembly includes (a) a cylindrical housing having an axial bore, at least a portion of the bore being defined by a threaded surface configured to engage a screw shaft; (b) at least one bearing disposed in the axial bore of the housing; (c) at least one retainer ring disposed in the axial bore of the housing; and, (d) a cylindrical lubricant block disposed in the axial bore of the housing, the lubricant block being fabricated from a microporous polymer which is impregnated with a lubricant oil.

20 Claims, 8 Drawing Sheets

SELF LUBRICATING LINEAR MOTION GUIDED SCREW ASSEMBLY

CROSS-REFERENCE TO RELATED APPLICATIONS

This application is a continuation-in-part of U.S. application Ser. No. 13/445,469 filed Apr. 12, 2012, which claims priority to U.S. Provisional Application No. 61/475,877 filed Apr. 15, 2011, both of which are is herein incorporated by reference.

FIELD OF THE INVENTION

The present disclosure relates to a screw assembly for a linear motion device, and in particular to linear lead screw assemblies and ball screw assemblies.

BACKGROUND OF THE ART

Linear motion devices are actuators which convert non-linear motion (e.g., rotary motion) to linear motion. Various types of linear motion devices are known and include, for example, traveling nut actuators such as lead screw assemblies and ball screw assemblies. Various types of lead screw assemblies and ball screw assemblies are known in the art. These devices convert rotary motion to linear motion, or vice versa, while supporting axial loads along the screw shaft. A limitation to convention systems is the reduction of performance and useful life when a radial load (i.e., a load applied perpendicular to the screw shaft) and/or a moment load (i.e., a bending load) is applied to the assembly. To compensate for such non-axial loads the linear guide system must be made of stronger, and therefore heavier and more costly components. Typical guide systems under present technology use round or square linear shafts and bearings. Such guidance systems are usually expensive to both make and maintain. They require extensive installation alignment features and periodic maintenance to ensure proper functioning. What is needed is a simpler assembly which reduces the cost, complexity and size of the system.

Moreover, lubrication is required whenever there is metal to metal contact. Such lubrication is typically done by application of a grease or oil. However, this is unacceptable where the apparatus cannot be serviced or where application of a lubricant is undesirable to the environment as, for example, in medical, food processing, semiconductor fabrication, etc.

SUMMARY OF THE INVENTION

A cartridge assembly is provided herein for use in conjunction with a linear motion guided screw assembly, the cartridge assembly comprising (a) a cylindrical housing having an axial bore, at least a portion of said bore being defined by a threaded surface configured to engage a screw shaft; (b) at least one bearing disposed in the axial bore of the housing; (c) at least one retainer ring disposed in the axial bore of the housing; and, (d) a cylindrical lubricant block disposed in the axial bore of the housing, said lubricant block being fabricated from a microporous polymer which is impregnated with a lubricant oil.

The linear motion guided screw assembly of the invention provides all of the benefits of conventional systems while eliminating the need for more robust linear guide systems to accommodate radial or moment loads. The present invention uses a simple guide follower to eliminate rotation, thereby reducing cost, complexity and system size.

More details of these embodiments and others of the present invention are described in greater details in the sections below.

BRIEF DESCRIPTION OF THE DRAWINGS

The drawings constitute a part of the specification and include exemplary embodiments of the present invention and illustrate various objects and features thereof wherein.

DETAILED DESCRIPTION OF PREFERRED EMBODIMENT(S)

Figure 1:
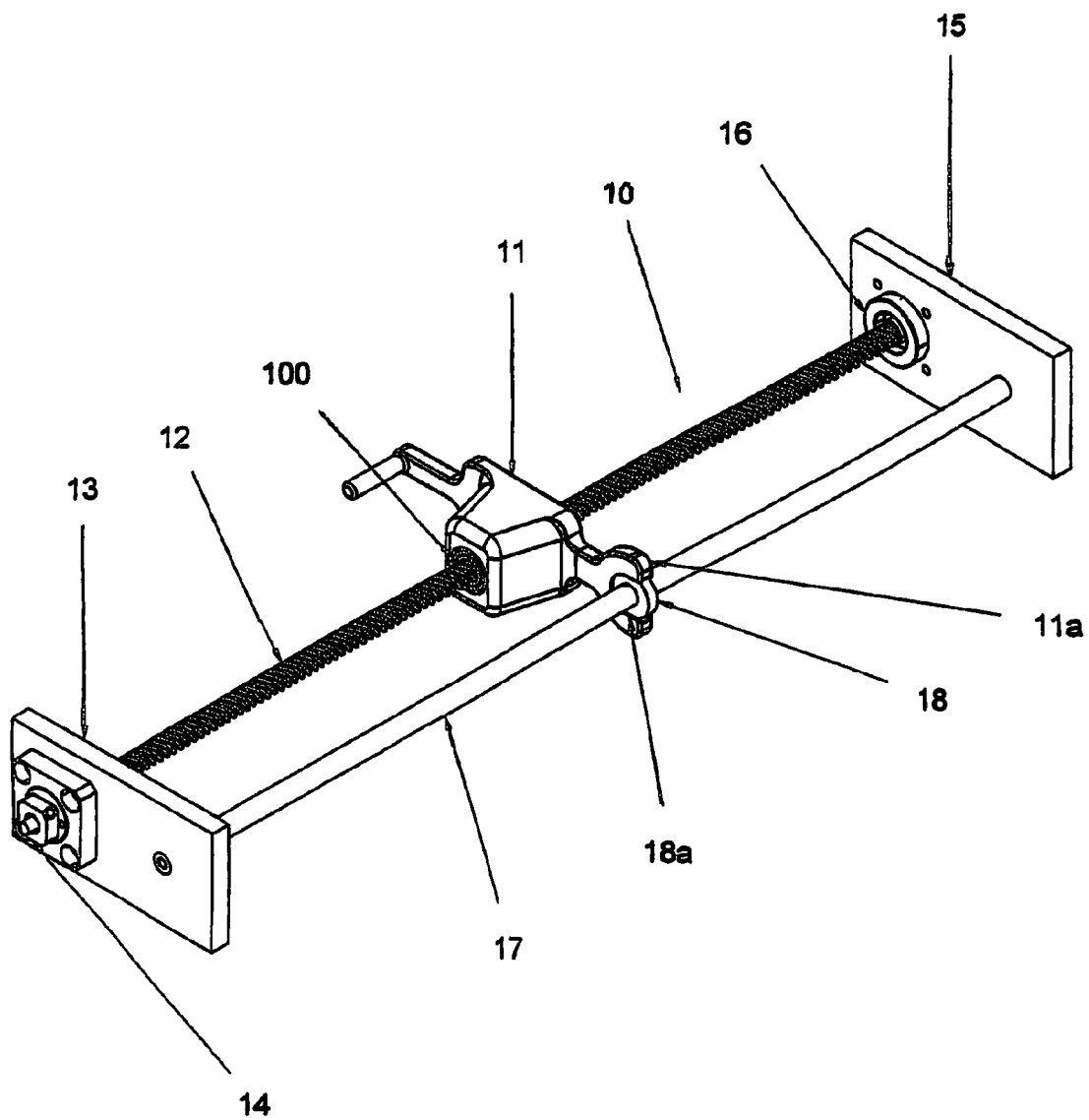
FIG. 1 is a perspective view of a linear motion guided screw assembly.

Various embodiments are described below with reference to the drawings. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiment of the invention.

For the purposes of this specification and appended claims, unless otherwise indicated, all numbers expressing components and sizes and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding the numerical ranges and parameters set forth herein, the broad scope of the invention are approximations, the numerical values set forth in the specific specification are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

The headings in this application are not meant to limit the disclosure in any way; embodiments under any one heading may be used in conjunction with embodiments under any other heading.

It is noted that, as used in this specification and the appended claims, the singular forms "a," "an," and "the," include plural referents unless expressly and unequivocally limited to one referent. Thus, for example, reference to "a support plate" includes one, two, three or more support plates.

Reference will now be made in detail to certain embodiments of the invention, examples of which are illustrated in the accompanying drawings. While the invention will be described in conjunction with the illustrated embodiments, it will be understood that they are not intended to limit the invention to those embodiments. On the contrary, the invention is intended to cover all alternatives, modifications, and equivalents that may be included within the invention as defined by the appended claims.

Referring now to FIG. 1, a linear motion guided screw assembly 10 includes a follower assembly 11 movably mounted to a screw shaft 12. Screw shaft 12, is rotatably mounted at one end to at least a first end support 15, which prevents axial movement of the screw shaft 12. The linear motion assembly 10 includes a second end support 13 spaced apart from the first end support 15, to which screw shaft 12 is also rotatably mounted, screw shaft 12 extending longitudinally between support plates 13 and 15. More particularly, one end of screw shaft 12 is supported by screw support 14 in support plate 13. The other end of screw shaft 12 is supported by screw support 16 in support plate 15. The screw shaft 12 is rotatably supported in screw supports 14 and 15, for example, by plain bearings, ball bearings or roller bearings. Screw shaft 12 can be fabricated from ferrous or non-ferrous metals such as steel (hardened or unhardened), bronze, brass, aluminum, titanium, and the like, and can optionally be coated with one or more of polytetrafluoroethylene (PTFE), chromium plating, nickel plating, cadmium plating, zinc plating, tungsten disulfide or molybdenum disulfide. In an embodiment the screw shaft can have Acme threads, trapezoidal threads, lead screw threads or ball screw threads.

In an embodiment, follower assembly 11 includes an anti-rotation means, i.e., lateral extension 11a, which includes an annular anti-rotation bearing 18 having an opening 18a configured and sized to accommodate rectilinear rod 17. The linear motion assembly 10 further includes a guide means, i.e., rectilinear rod 17 optionally having a circular cross section and a smooth outer surface. Alternatively, rod 17 can have a quadrangular cross section; it can be a profile rail or a slotted guide rail. Rod 17 is affixed to support plates 13 and 15 and extends therebetween in an orientation parallel to the screw shaft 12. Rod 17 is translatably disposed through the opening 18a in anti-rotation bearing 18. Rotation of the screw shaft 12 causes the follower assembly 11 to move longitudinally forward or backward along the screw shaft 12 depending on whether screw shaft 12 is turned in a clockwise or counterclockwise direction. The anti-rotation bearing 18, which is fixedly connected to the extension 11a of the follower assembly 11, prevents the follower assembly 11 from rotating. This anti-rotation feature is necessary to restrict the movement of the follower assembly 11 to linear movement along the screw 12 when screw 12 is rotated.

The follower assembly 11 includes a guide nut cartridge, which can be a ball nut cartridge 100 or a lead nut cartridge 200 as described below, which are non-rotatably mounted within the follower assembly 11.

Common design features of the ball nut and lead nut designs are shown as cartridge style housings. The internal features may be integrated into a custom OEM housing or can be provided as shown for custom installations. The housing material will be selected based on load capacity and environment, but preferred materials of construction are steel and aluminum. The guide nut (i.e., the ball nut or lead nut) may be supplied as standard lash or zero lash components depending on the application requirements. Bearing selection is dependent upon load configuration and capacity and may be plain bearings, radial bearings, angular contact bearings or other types of bearings. The cartridge must be equipped with an anti-rotation feature, which can be, for example a keyway or pin as shown herein.

Linear ball assemblies operate by including ball bearings, which guided between the ball nut and the screw threads. The ball bearings typically travel through a channel or duct in the ball nut and greatly reduce the friction between the screw and the ball nut as well as support radial and moment loads as well as axial loads. More particularly, the linear motion device is adapted to handle loads (e.g., compression or tension loads) in the axial direction. However, the linear motion device can also be subjected to radial loads (i.e., loads in a direction lateral to the screw axis). Also, an excessive compressive load can subject the screw to a bending or moment load, which causes a twisting of the nut so that the axis of the nut is not properly aligned with the axial direction of the linear motion device. The present invention better handles not only the axial load but also the radial and moment loads by providing reactive loads as described below. This is important for applications where precise positioning of the follower assembly is required.

Figure 2A:
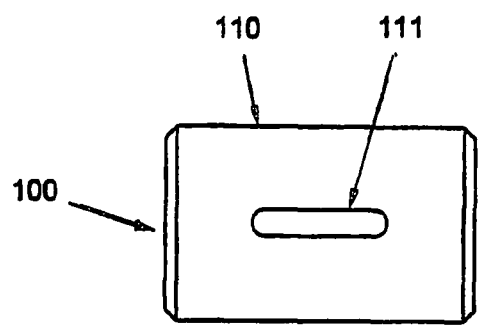
FIGS. 2A and 2B are, respectively, plan and sectional views of a ball nut cartridge for the linear motion guided screw assembly.
Figure 2B:
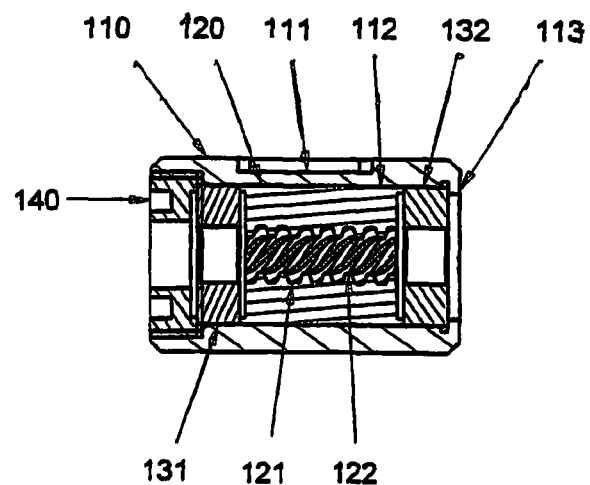

Referring now to FIGS. 2A and 2B, a configuration for a typical ball nut cartridge is depicted. An internal return, cylindrical ball nut is positioned between two angular contact bearings which are retained in the cartridge by a housing step and a retaining nut. As ball nuts are capable of relatively high axial loads, the cartridge is made from steel or other suitable material, and the bearings are angular contact bearings to fully support both the axial, radial, and moment loads applied. A retaining nut locks the internal components together to eliminate free play.

In one embodiment of the invention as shown in FIGS. 2A and 2B, the ball nut cartridge 100 includes an outer cylindrical housing 110 having a linear keyway 111 to prevent rotation of the housing 110 within the follower assembly 11. The cartridge 100 further includes an internal return cylindrical ball nut 120 disposed within an axial opening 112 in housing 110. Ball nut 120 includes a bore 121 defined by an interior surface having helical groove 122, which defines a raceway for ball bearings. The ball bearings (not shown) also engage the outer threaded surface of screw 12 to provide a substantially reduced friction rotation of the screw 12 with respect to the ball nut cartridge 100.

Ball nut 120 is positioned between and in contact with angular contact bearings 131 and 132. The angular contact bearing 132 abuts a stop surface provided by an annular ridge 113 at one end of housing 110 and is retained within the axial opening 112 of the housing 110. The other angular bearing 131 is held in place by retainer nut 140, which locks the components 131, 120 and 132 in place so as to eliminate any axial free play.

The ball nut cartridge 100, including the housing 110, ball nut 120, angular contact bearings 131 and 132 and/or retainer nut 140 can be fabricated from any suitable material. Preferred materials of construction include steel (e.g., high carbon steel, stainless steel), aluminum, brass, nickel-chrome alloys, ceramics, high strength engineering plastics and the like. Engineering plastics suitable for use in the present invention include, for example, acrylonitrile butadiene styrene (ABS), polycarbonates (PC), polyamides (PA), polybutylene terephthalate (PBT), polyethylene terephthalate (PET), polyphenylene oxide (PPO), Polysulphone (PSU), polyetherketone (PEK), polyetheretherketone (PEEK), polyimides, polyphenylene sulfide (PPS), and polyoxymethylene plastic (POM). Optionally, the ball nut 120 can be adhesively secured in the housing 110, for example by cyanoacrylate or epoxy adhesives. Alternatively, the ball nut 120 and the housing can be of integral, single piece construction Referring now to FIGS. 3A and 3B, a configuration for a lead nut cartridge is depicted. A modified lead nut is positioned between two radial or plain bearings, which are retained in the cartridge by multiple retaining rings and preloaded with one or more belleville spring washers. By preloading the bearings the spring washers eliminate axial free play and accommodate any variations in thermal expansions or contractions due to different materials of construction.

Figure 3A:
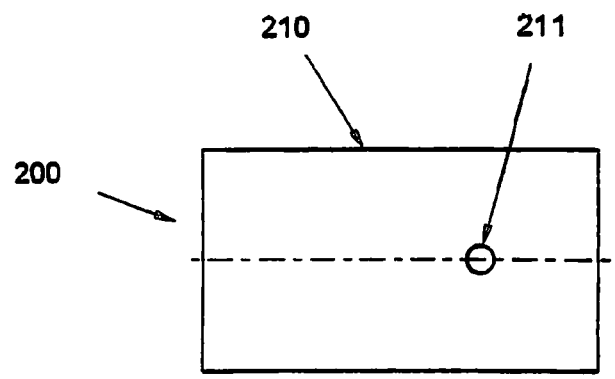
FIGS. 3A and 3B are, respectively, plan and sectional views of a lead nut cartridge for the linear motion guided screw assembly.
Figure 3B:
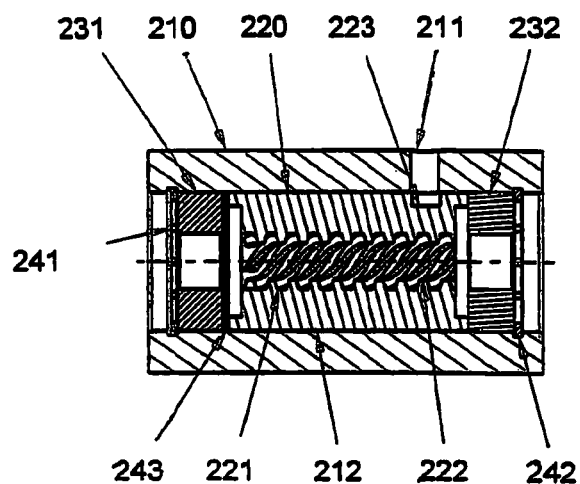

As shown in FIGS. 3A and 3B, in another embodiment of the invention a lead nut cartridge 200 includes an outer cylindrical housing 210 having a radial opening 211 to receive a locating pin. (Not shown). The cartridge 200 further includes an internal lead nut 220 disposed within an axial opening 212 of housing 210. Lead nut 220 includes a bore 221 defined by an interior threaded surface 222 sized and configured to closely and rotatably engage the outer threaded surface of screw 12. Lead nut 220 includes a recess 223 aligned with radial opening 211 in the housing to receive the end portion of the locating pin. When fully engaged with the recess 223, the locating pin prevents rotation of the lead nut 220 within axial opening 211 of the housing 210, and housing 210 within the follower assembly 11.

Figure 4A:
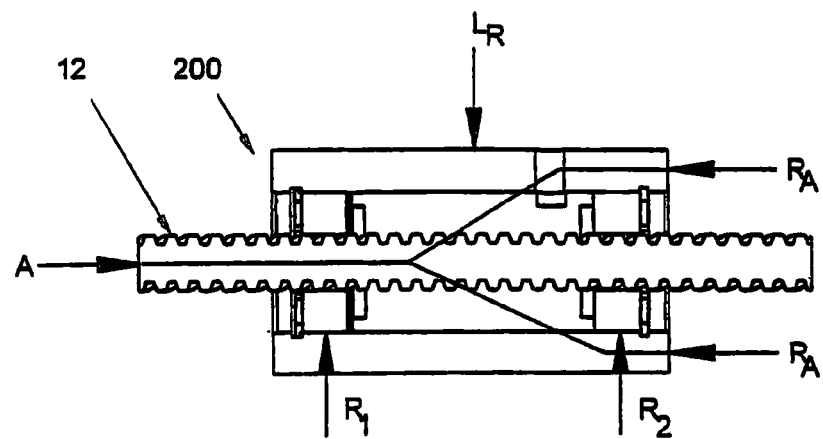
FIGS. 4A and 4B are diagrammatic views illustrating the force vectors on a cartridge.
Figure 4B:
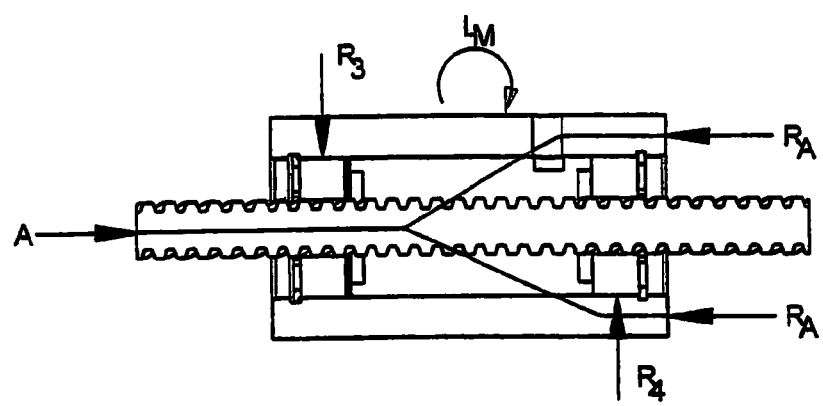

Lead nut 220 is positioned between two bearings 231 and 232, which can independently be radial or plain bearings. Retainer rings 241 and 242 retain the bearings 231, 232 and the lead nut 220 within the axial opening 212 in housing 210. Lead nut cartridge 200 is preloaded using at least one belleville washer 243 disposed between bearing 231 and the lead nut 220. The belleville washer 243 applies an axial biasing force to the lead nut 220 to eliminate free axial play of the lead nut 220 within the housing 210. Optionally, the lead nut 220 can be adhesively secured in the housing 210, for example by cyanoacrylate or epoxy adhesives. Alternatively, the lead nut 220 and the housing 210 can be of integral, single piece construction Referring now to FIGS. 4A and 4B, force vectors operating on a cartridge are illustrated. By way of example lead nut cartridge 200 is illustrated, although the drawings can apply to ball nut cartridge 100 as well. In operation, when the screw 12 disposed through the axial bore of the cartridge 22 is rotated, various forces act upon the cartridge. FIGS. 4A and 4B illustrate an axial load A acting through the screw member 12, which is resisted by reactive loads $R_A$ acting in a direction opposite to axial load A through the cartridge 200.

As shown in FIG. 4A, in the event a radial load $L_R$ is applied to the cartridge, radial reactive loads $R_1$ and $R_2$ act in parallel in a direction opposite to $L_R$.

As shown in FIG. 4B a moment load $L_M$, i.e., a twisting force, can act upon the cartridge 200, for example, by flexing of the screw shaft 12. Reactive loads $R_3$ and $R_4$ counter $L_M$ by acting radially but in a direction opposite to each other.

Figure 5:
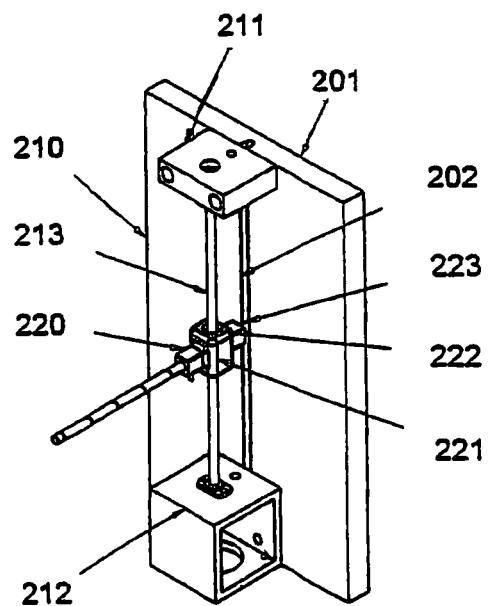
FIG. 5 is a perspective view of an alternative embodiment of the invention.

Referring now to FIG. 5, in an embodiment the linear motion assembly 210 is connected to a back plate 201 having a longitudinal slot 202. First and second end supports 211 and 212 are fastened to the back plate 201. Screw shaft 213 extends between the first and second end supports 211 and 212 and is rotatably mounted thereto. Follower assembly 220 includes a body portion 221 and a lateral extension 222 extending from the body 221. The follower assembly 220 is movably disposed on longitudinal screw shaft 213 and is linearly movable in response to rotation of the screw shaft 213. The lateral extension 222 includes a guide plate 223, which is translatably disposed in slot 202. In this embodiment, the slot 202, which extends longitudinally and parallel to the screw shaft 213, serves as a guide means and at least the guide plate 223 connected to the follower assembly 220 via lateral extension 222 serves as an anti-rotation means.

Figure 6:
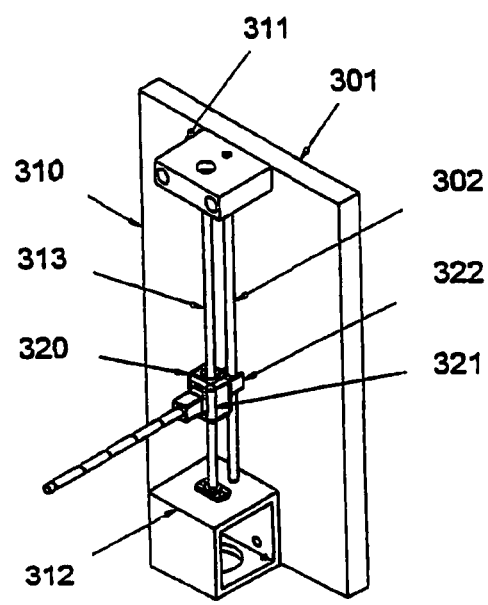
FIG. 6 is a perspective view of another alternative embodiment of the invention.

Referring to FIG. 6, in another embodiment the linear motion assembly 310 is connected to a back plate 301. First and second end supports 311 and 312 are fastened to the back plate 301. A longitudinal screw shaft 313 extends between the first and second end supports 311 and 312 and is rotatably mounted thereto. Also, a linear rod 302 extends between the first and second end supports 311 and 312 in a longitudinal direction parallel to the screw shaft 313 and is fixedly mounted to the end supports 311 and 312. Linear rod 302 serves as a guide means. Follower assembly 320 includes a body portion 321 and an anti rotation means 322, which translatably engages the linear rod 302. Guide means 322 can be an embodiment as illustrated in FIGS. 7 and 8.

Figure 7:
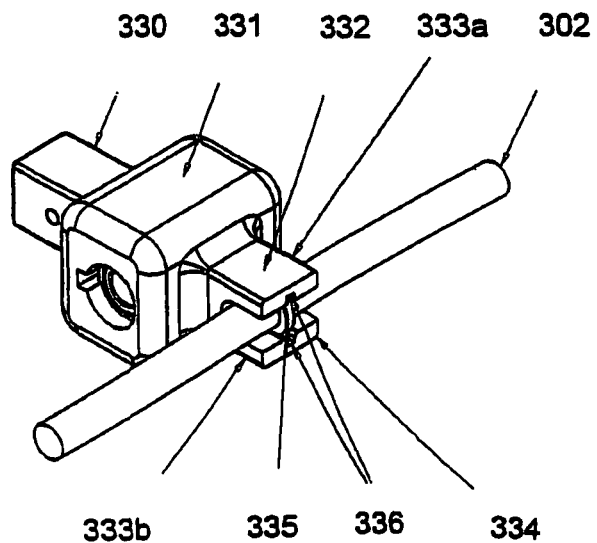
FIG. 7 is a perspective view of an alternative embodiment of the follower assembly.

Referring to FIG. 7, follower assembly 330 includes a body portion 331 and an anti rotation means 332 which includes a U-shaped member defined by parallel legs 333a and 333b spaced apart by channel 334. Legs 333a and 333b each include a respective groove 336 aligned parallel to each other in opposing relationship for translatably mounting an annular bearing 335. The annular bearing 335 has an axial opening through which the linear rod 302 can be translatably disposed.

Figure 8:
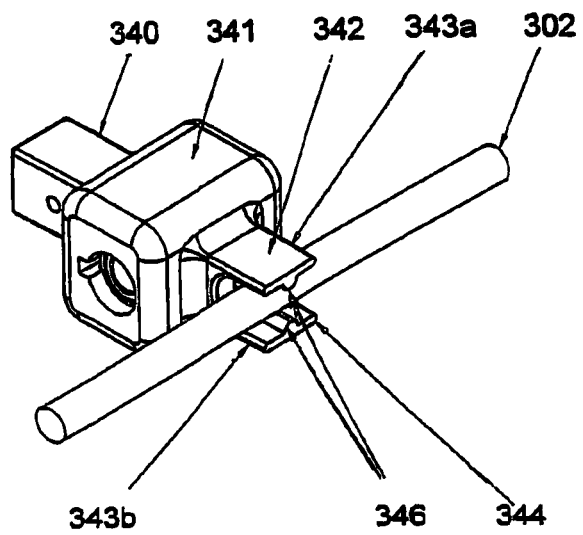
FIG. 8 is a perspective view of another alternative embodiment of the follower assembly.

Referring to FIG. 8, follower assembly 340 includes a body portion 341 and an antirotation means 342 which includes a U-shaped member defined by parallel legs 343a and 343b spaced apart by channel 344. Legs 343a and 343b each include a respective ridge 346 aligned parallel to each other in opposing relationship for translatably engaging the linear rod 302.

Figure 9:
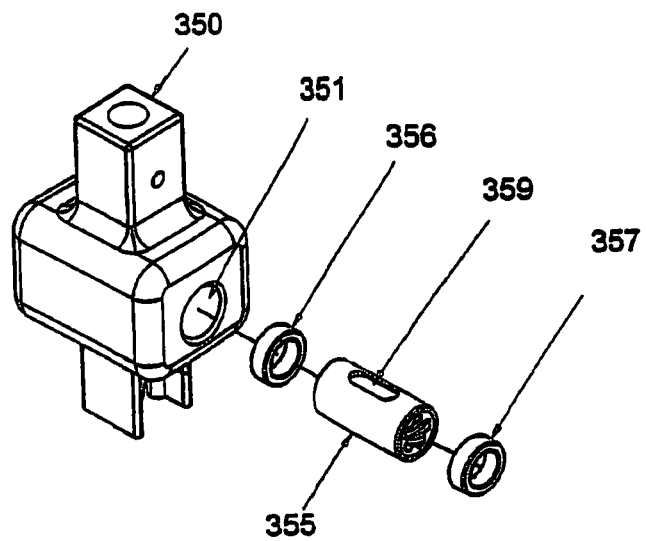
FIG. 9 illustrates the follower assembly of claim 8 in conjunction with an embodiment of the cartridge assembly.

Referring now to FIG. 9, in an embodiment the follower assembly 350 includes a channel 351 into which guide nut 355 can be mounted. The guide nut 355 is retained in the follower assembly 350 by bearings 356 and 357. Alternatively, the guide nut portion 355 can be secured in the follower assembly 350 by means of an adhesive such as, e.g., epoxy cement or cyanoacrylate adhesive. A notch 359 in the guide nut 355 prevents rotation of the guide nut in the follower when engaged by a locating pin (not shown) in the follower.

Figure 10:
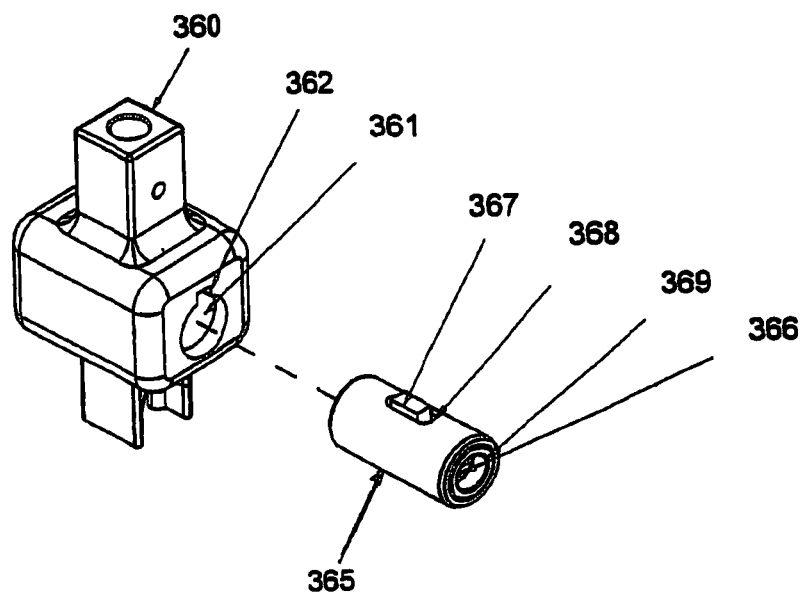
FIG. 10 illustrates the follower assembly of claim 8 in conjunction with another embodiment of the cartridge assembly.

Referring now to FIG. 10, in another embodiment the follower assembly 360 includes a channel 361 into which a cartridge 365 can be mounted. Cartridge 365 includes a bore into which guide nut 366 is disposed. Guide nut 366 includes a detent 367 projecting through slot 368 in the cartridge housing 365. Detent 367 is engagable with slot 362 in the channel 361 to prevent rotation of the guide nut 366. Guide nut 366 is retained in the cartridge 365 by bearings 369

The size, dimension, configuration of components of the linear motion assembly 10 of the invention as well as the materials of construction are arranged to support radial and moment loads as well as axial loads. The components of the invention can be fabricated by conventional methods.

The linear motion device of the invention can be used wherever rotary motion needs to be converted to linear motion such as, for example, for the linearly movable print heads in office printing machines, in weft-carrying grippers in weaving looms, and various other applications.

Figure 11:
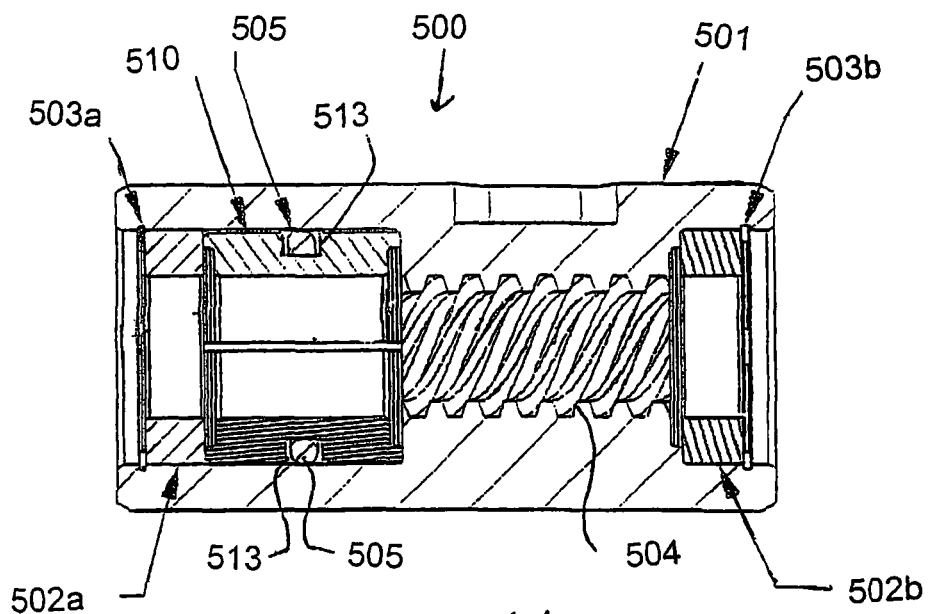
FIG. 11 is a sectional view illustrating a cartridge assembly having a lubricant block.
Figure 12:
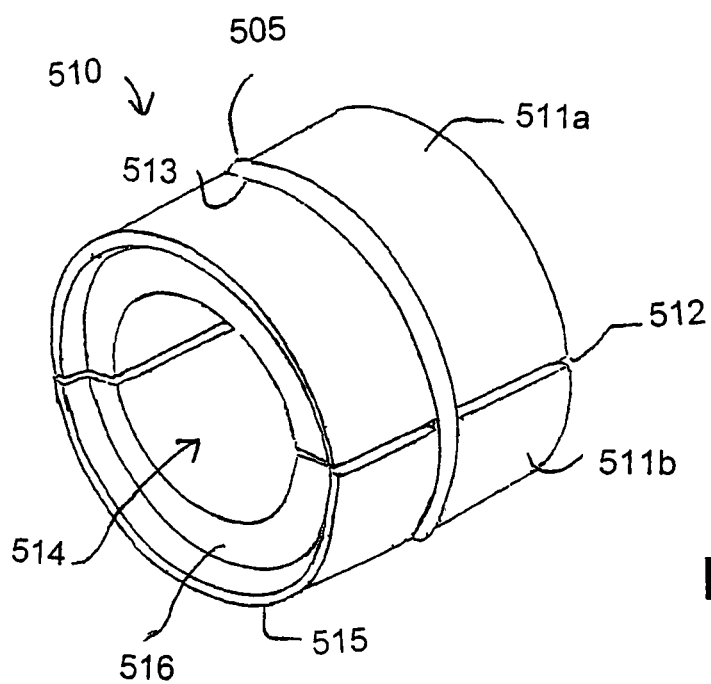
FIG. 12 is a perspective view of the lubricant block.

Referring now to FIGS. 11 and 12, in another embodiment a cartridge assembly 500 is shown which includes a cylindrical housing 501 containing bearings 502(*a*) and 502(*b*), and retainer rings 503(*a*) and 503(*b*). A threaded bore 504 is adapted to receive a screw shaft. Cartridge assembly 500 further includes a lubricant block 510.

Lubricant block 510 is generally cylindrical in shape and is fabricated from a microporous polymeric material fabricated from polymers such as polyethylene, polymethylpentene, polypropylene, polyurethane, polyester, and polyamide. Preferred materials include high density polyethylene and polymethylpentene. Microporous polymeric matrixes suitable for use in the present invention are disclosed, for example, in U.S. Pat. Nos. 3,541,011, 3,547,819, 3,729,415, 4,146,487, 4,239,632 and 4,486,319, each of which is incorporated by reference herein. The lubricant block 510 is fabricated in two separable parts, upper half 511(*a*) and lower half 511(*b*), which are configured to contact each other at a horizontal interface 512. A groove 513 extends circumferentially around the outer surface of the lubricant block 510 and is configured to receive an O-ring 505 or an annular spring member. The end surfaces of the lubricant block 510 are defined by a circumferential ridge 515 and an annular surface 516. Together, circumferential ridge 515 and annular surface 516 define a recess configured such that circumferential ridge 515 provides a bearing shoulder which contacts only the outer race of bearing 502*a* without applying friction to the inner race. Both end surfaces of the lubricant block are similarly configured and dimensioned. When the two parts 511(*a*) and 511(*b*) are joined, they define an axial bore 514 through which the screw shaft is disposed.

The lubricant block 510 has incorporated in its pores a lubricant oil such as mineral oils, vegetable oils, animal oils, and synthetic oils such as hydrogenated polyolefins, polyesters, silicones and fluorocarbons. Lubricant oils suitable for use in the present invention are disclosed, for example, in U.S. Pat. No. 3,547,819. Oil is wicked through capillary pores to the inner surface of the bore 514, which is in contact with the outer surface of the screw shaft, by the heat generated by sliding friction between the shaft and the bore 514. The division of the lubricant block 510 into two adjacent parts 511(*a*) and 511(*b*) helps minimize drag torque. The O-ring or spring 505 applies a constant but light radial force.

The lubricant block 510 can be removed and replaced without removing the cartridge 500 from the shaft thereby facilitating maintenance and inspection. Although the cartridge assembly 500 has been described above for use in conjunction with a screw shaft such as shaft 12 illustrated in FIG. 1, bore 504 can be defined by a smooth inner surface so that cartridge assembly 500 can also be used in conjunction with a linear shaft such as linear rod 302 illustrated in FIGS. 7 and 8.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A cartridge assembly for use in conjunction with a linear motion guided screw assembly, the cartridge assembly comprising:
   a) a cylindrical housing having an axial bore, at least a portion of said bore being defined by a threaded surface configured to engage a screw shaft;
   b) at least one bearing disposed in the axial bore of the housing;
   c) at least one retainer ring disposed in the axial bore of the housing; and,
   d) a cylindrical lubricant block disposed in the axial bore of the housing, said lubricant block being fabricated from a microporous polymer which is impregnated with a lubricant oil,
   and shaped as a ring having a smooth inner surface disposed to contact only a major diameter of the guide screw.

2. The cartridge assembly of claim 1 wherein the lubricant block comprises adjacent first and second portions which are separable from each other, wherein said first and second portions, when joined at an interface, define an axial channel.

3. The cartridge assembly of claim 1 wherein the lubricant block comprises a circumferential channel.

4. The cartridge assembly of claim 3 including an O-ring or circular spring member disposed within the circumferential channel of the lubricant block.

5. The cartridge assembly of claim 1 wherein the lubricant block includes first and second opposite ends, each end including a recess defined by an axially-extending circumferential ridge and an annular surface opening towards the axial direction.

6. The cartridge assembly of claim 5 further including first and second belleville washers, each belleville washer being configured to be seated in a respective end recess of the lubricant block.

7. The cartridge assembly of claim 1 wherein the lubricant block is fabricated from high density polyethylene or polymethylpentene.

8. The cartridge assembly of claim 1 wherein the lubricant oil is selected from mineral oil, vegetable oil, animal oil hydrogenated polyolefins, polyesters, silicones and fluorocarbons.

9. A lubricant block fabricated from a microporous polymer which is impregnated with a lubricant oil, wherein the lubricant block comprises
   adjacent first and second portions which are separable from each other, wherein said first and second portions, when joined at an interface, define an axial channel,
   a circumferential channel configured to receive an O-ring or circular spring,
   wherein the lubricant block includes first and second opposite ends, each end including a recess defined by a circumferential ridge and an annular surface.

10. The lubricant block of claim 9 wherein the lubricant block is fabricated from high density polyethylene or polymethylpentene, and the lubricant oil is selected from mineral oil, vegetable oil, animal oil hydrogenated polyolefins, polyesters, silicones and fluorocarbons.

11. A linear motion guided screw assembly comprising:
   a) at least a first end support;
   b) a screw shaft having a thread form and defining a longitudinal direction and rotatably mounted at one end to the first end support, a thread form of the screw being arranged so as to support both axial and radial loads,
   c) a guidance means mounted to said end support and oriented parallel to the screw shaft;

d) a follower assembly physically associated to the screw shaft and, associated therewith, an anti-rotation means in translatable contact with the guidance means and movable in a longitudinal direction along said guidance means; and e) a cartridge assembly including
   i. a cylindrical housing having an axial bore, at least a portion of said bore being defined by a threaded surface configured to engage a screw shaft;
   ii. at least one bearing disposed in the axial bore of the housing;
   iii. at least one retainer ring disposed in the axial bore of the housing; and,
   iv. a cylindrical lubricant block disposed in the axial bore of the housing, said lubricant block being fabricated from a microporous polymer which is impregnated with a lubricant oil,
   and shaped as a ring having a smooth inner surface disposed to contact only a major diameter of the guide screw.

12. The screw assembly of claim 11 further including a second end support to which the screw shaft is rotatably mounted.

13. The screw assembly of claim 11 wherein the screw shaft is coated to improve lubricity, wear resistance, corrosion resistance, or load capacity.

14. The screw assembly of claim 11 wherein the guidance means is a linear member having a circular or polygonal cross section and the anti rotation means comprises a bearing disposed around the linear member.

15. The screw assembly of claim 11 wherein the lubricant block comprises adjacent first and second portions which are separable from each other, wherein said first and second portions, when joined at an interface, define an axial channel.

16. The screw assembly of claim 11 wherein the lubricant block comprises a circumferential channel.

17. The screw assembly of claim 16 wherein the cartridge assembly includes an O-ring or circular spring member disposed within the circumferential channel of the lubricant block.

18. The screw assembly of claim 11 wherein the lubricant block includes first and second opposite ends, each end including a recess defined by an axially-extending circumferential ridge and an annular surface opening towards the axial direction.

19. The screw assembly of claim 18 wherein the cartridge assembly further includes first and second belleville washers, each belleville washer being configured to be seated in a respective end recess of the lubricant block.

20. The screw assembly of claim 11 wherein the lubricant block is fabricated from high density polyethylene or polymethylpentene and the lubricant oil is selected from mineral oil, vegetable oil, animal oil hydrogenated polyolefins, polyesters, silicones and fluorocarbons.

* * * * *